June 4, 1968  KIYOKATSU OBATA  3,386,204
SLIDING DOOR ARRANGEMENT

Filed Oct. 5, 1966  3 Sheets-Sheet 2

INVENTOR.
Kiyokatsu Obata
BY Kelman and Berman
Agents

United States Patent Office 3,386,204
Patented June 4, 1968

3,386,204
SLIDING DOOR ARRANGEMENT
Kiyokatsu Obata, Kanagawa Prefecture, Japan, assignor to Kato Body Manufacturing Company, Ltd., Tokyo, Japan
Filed Oct. 5, 1966, Ser. No. 584,426
Claims priority, application Japan, Oct. 23, 1965, 40/64,845
5 Claims. (Cl. 49—212)

ABSTRACT OF THE DISCLOSURE

A door for a freight car or the like is received flush in the car wall when closed. It moves outward of the door opening and then along the outer car surface on three sets of guide members. Two sets telescope to fit into the door opening when collapsed and move outward and inward of the door opening on the guide members of the third set which slide in receptacles below and above the opening and the freight area of the car so that the open door and the freight area are unobstructed by the door mechanism. The door is moved outward and inward of the opening by levers or latches on the underside of the car.

---

This invention relates to sliding doors, and particularly to a sliding door arrangement suitable for vehicles such as box cars or automotive trucks, or trailers though not limited to such applications.

The freight loading and unloading doors of railroad cars, trucks, or trailers are either hingedly mounted or arranged for sliding movement on guide rails. Hinged doors obstruct the working space near the door opening when in the open condition. The conventional guide rails for sliding doors are installed either within the truck or on its outside and reduce the effective available loading space for given overall dimensions of the vehicle.

The object of the invention is the provision of a vehicle door having all the common advantages of a sliding door, yet not requiring any space that could otherwise be used for carrying goods on the vehicle.

Another object is the prevision of a sliding door which is flush with the door frame in the closed position, yet does not require the provision of a pocket in the frame nor in the adjacent vehicle wall for receiving the door when in the open position.

With these and other objects in view, as will become apparent hereinafter, the invention in one of its aspects resides in a door arrangement in which a door moves between a closed position in a door opening and an open position, the open position being offset from the closed position outwardly of a load area and laterally of the door opening. The door frame is constituted by a ceiling member and a floor member which vertically bound the load area and by two upright lateral members which connect the floor and ceiling members. The door is secured to the frame members by a guide assembly which includes a first guide member elongated in a lateral direction, a plurality of receptacles mounted on the floor member in laterally spaced relationship and downwardly spaced from the door opening in vertical alignment with the same, and a plurality of second guide members fixedly fastened to the first guide member and respectively received in the receptacles for linear movement in a direction transverse of the lateral direction so that the first guide member moves into and out of the door opening between a retracted position and an operative position when the second guide members move in the receptacles. The door is secured to the first guide member for movement thereon in the lateral direction. Moving means are mounted on the door frame for moving the first guide member inward and outward of the door opening.

Figure 1:
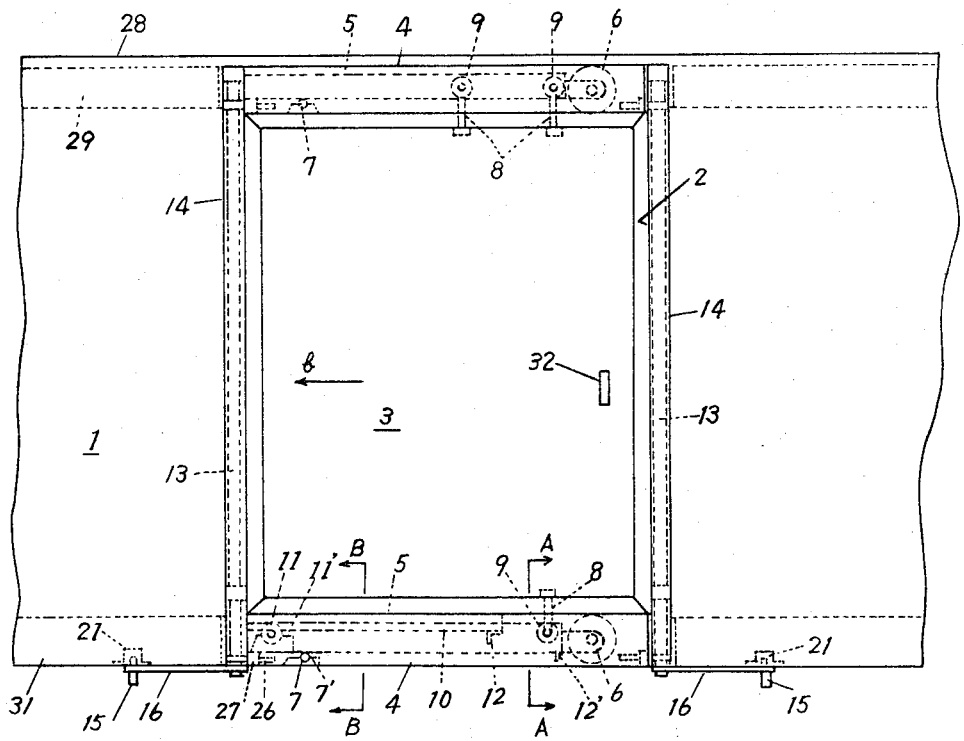
Figure 3:
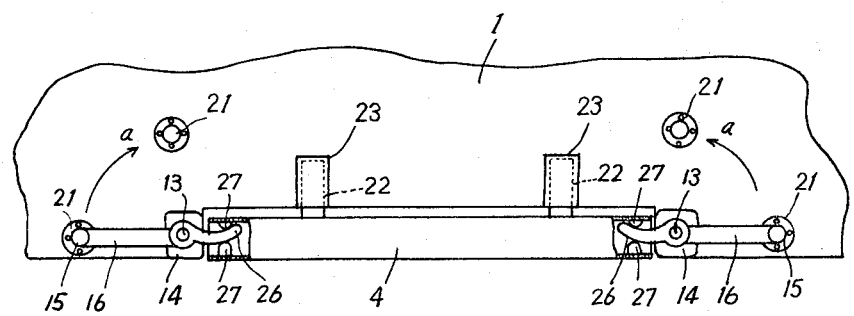
Figure 2:
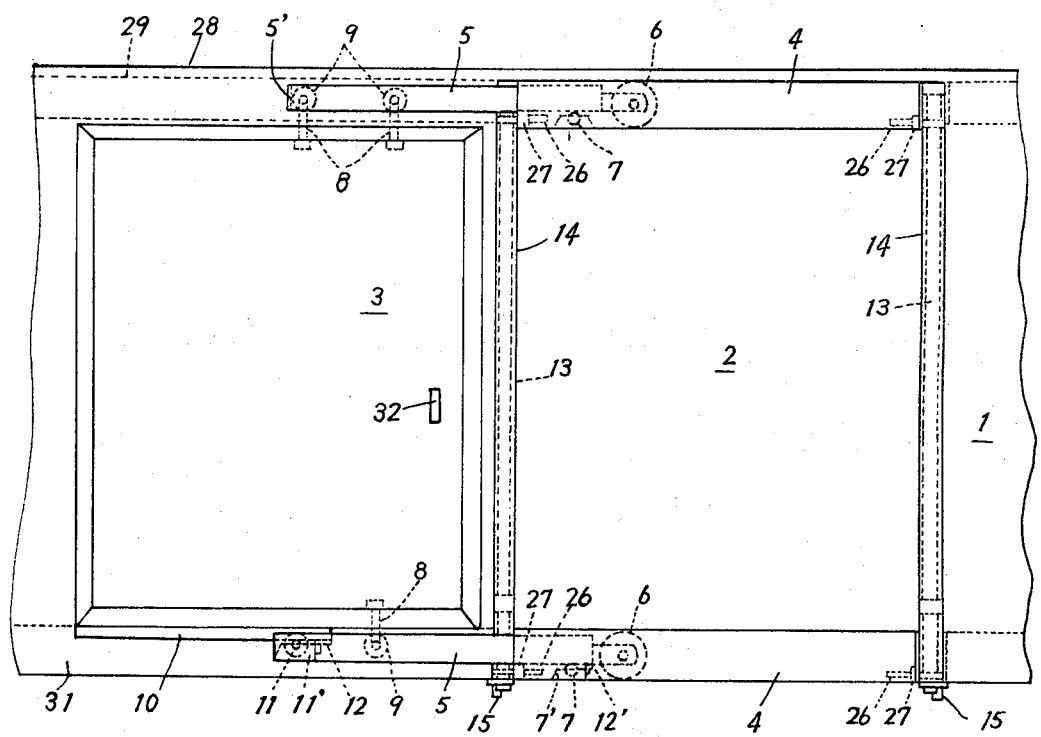
Figure 4:
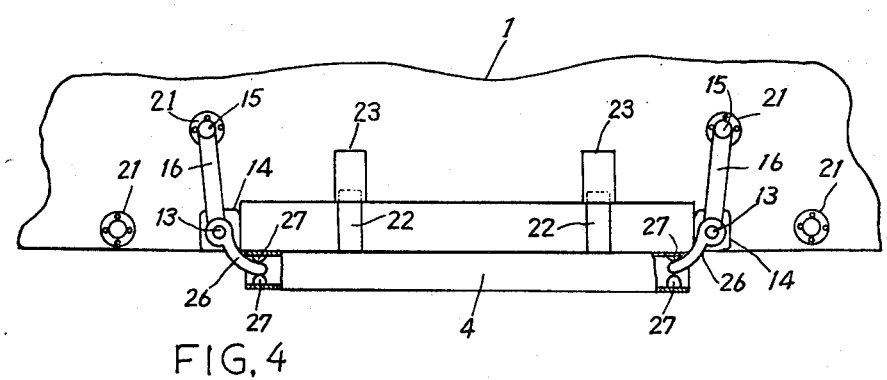
Figure 5:
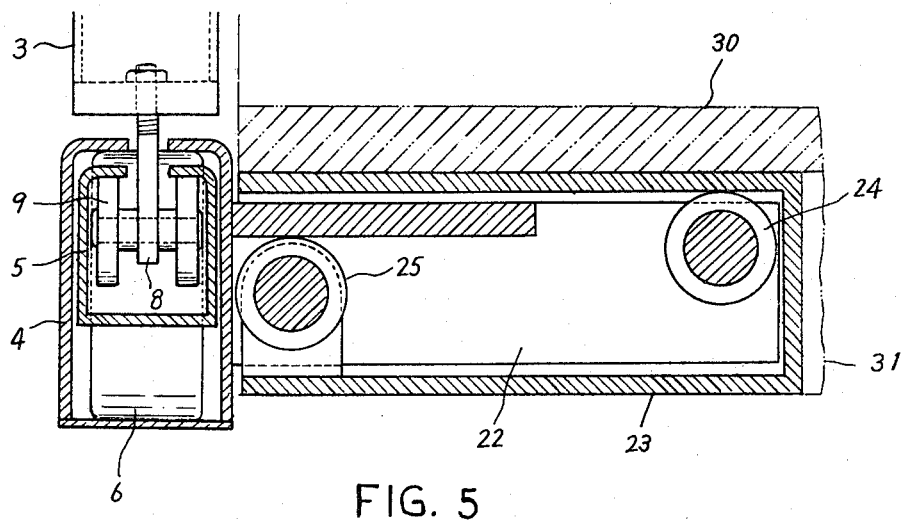
Figure 6:
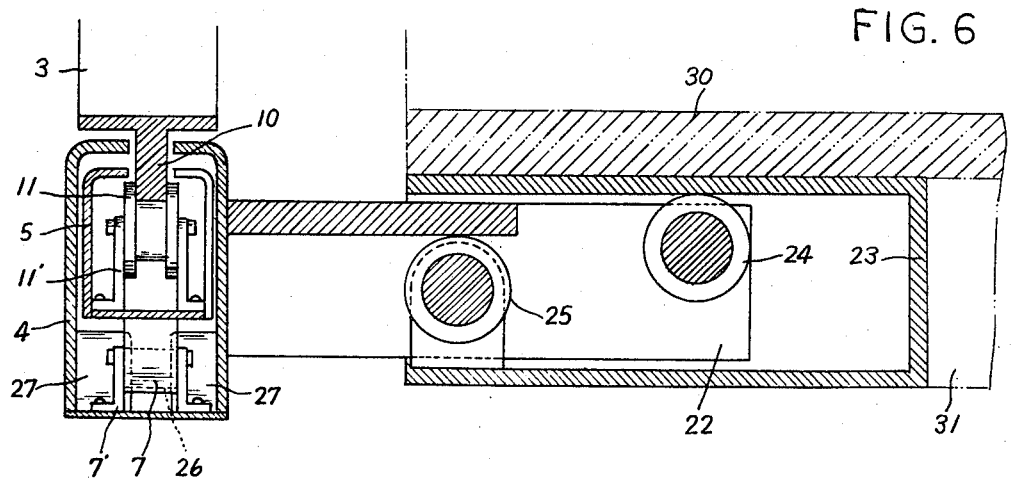
Figure 7:
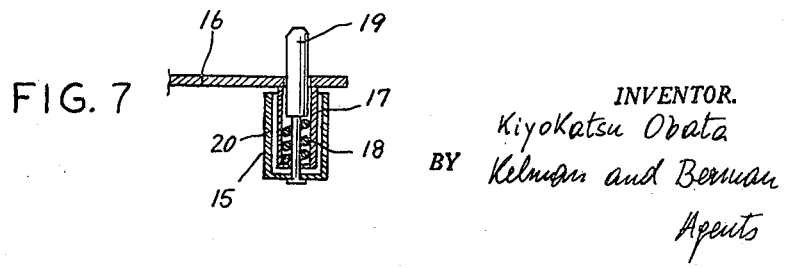

Other features, additional objects, and many of the attendant advantages of this invention will become apparent from the following detailed description of a preferred embodiment when considered in connection with the accompanying drawings in which:

FIG. 1 shows a portion of a truck equipped with a door arrangement of the invention, the view being in side elevation and showing the closed door;
FIG. 2 shows the apparatus of FIG. 1 with the door open;
FIG. 3 is a fragmentary bottom view of the truck in the position of FIG. 1;
FIG. 4 shows the apparatus of FIG. 3 with the door being in an intermediate position;
FIG. 5 shows a detail of the apparatus of FIG. 1 in front elevational enlarged section on the line A—A;
FIG. 6 shows another detail of the same apparatus in enlarged rear elevational section on the line B—B; and
FIG. 7 shows yet another detail of the apparatus of FIG. 1 in side elevational enlarged section.

Referring now to the drawing in detail, there is seen a truck body 1 having a bottom frame 31 and a top frame 29 which respectively support the floor 30 and the ceiling 28 of the truck body 1. The left side wall of the truck body 1 has a door opening 2 which is framed by hollow upright members 14 and respective portions of the ceiling and floor structure. In the position shown in FIG. 1, the door 3 is flush with the upright frame members 14 and obstructs the opening 2.

The door 3 is slidably mounted on two guide assemblies respectively supported by the top and bottom frames 29, 31. The guide assemblies are closely similar except as specifically mentioned hereinafter. Each guide assembly includes an outer channel member 4 of approximately C-shaped cross section best seen in FIGS. 5 and 6, in which an inner channel member 5 of similar cross section is received in telescoping engagement. Relative longitudinal displacement of the members 4, 5 is facilitated by rollers 6 mounted on the inner channel members 5 for rolling engagement with the member 4, and rollers 7 mounted on the outer channel members 4 by means of brackets 7′ for rolling engagement with the inner channel member 5.

A flanged roller 11 is mounted within the inner channel 5, near the truck floor on bearing brackets 11′ and is engaged by a guide rail 10 on the door 3. The door is vertically secured to the inner channel members 5 by rollers 9 on hangers 8 fixedly attached to the upper and lower door edges. The hangers 8 pass freely through the open sides of the channel members 4, 5. The horizontal movement of the channel members 4, 5 and of the door 3 relative to each other is limited by abutting engagement of the lower brackets 7′ with a stop 12′ on the inner lower channel member 5, by engagement of a front stop 12 on the rail 10 with the bearing bracket 11′ on the lower inner channel member 5, and by engagement of a stop 5′ on the upper channel member 5 with one of the rollers 9 on the door 3.

As is best seen in FIGS. 3 to 6, two guide brackets 22 are fixedly attached to the outer channel members 4 for sliding movement inward and outward of corresponding receptacles 23 on the bottom and top frames 31, 29, only the bottom arrangement being shown in the drawing in detail. Each bracket 22 is a piece of angle iron whose flange has been partly cut away to permit a roller 24 mounted on the web to engage the inner face of the receptacle 23. A roller 25 mounted on the wall of the latter engages the flnage of the bracket 22.

Movement of the guide assembly between the retracted position shown in FIGS. 3 and 5, and the operative position shown in FIGS. 4 and 6 is caused by a mechanism which includes shafts 13 rotatably mounted in the hollow upright frame members 14. Arms 16 fastened to the lower ends of the shafts 13 permit the shafts to be turned between the positions illustrated in FIGS. 3 and 4 respectively. The operating knob 15 is provided on each arm 16 is seen in detail in FIG. 7. It includes an inner cup-shaped shell 17 whose rim is fixidly fastened to the free end of the arm 16 and which encloses a helical compression spring 18. A locking pin 19 is biased by the spring 18 toward the position illustrated in FIG. 7 in which the pin projects upward from the arm 16. The pin passes through an opening in the bottom of the inner shell 17 and is attached to an outer shell 20 which permits the locking pin 19 to be withdrawn against the biasing spring 18 until it is flush with the top surface of the arm 16. Each pin 19 normally engages one of two openings 21 in the bottom of the truck body 1.

The bottom end of each shaft 13 also carries a latch 26 of arcuate configuration. A free end portion of each latch is slidably received between two rounded abutments 27 of wear resistant plastic in a longitudinal end portion of an outer channel member 4. When the shafts 13 are angularly moved about their axes, the free ends of the latches 26 move arcuately inward and outward of the door opening 2. In the position shown in FIG. 3, the four latches 26 of which only two are visible in the drawing, hold the channel member 4 in the retracted position. When the outer shells 20 of the knobs 15 are pulled downward until the locking pins 19 clear the truck bottom, the arms 16 may be swung simultaneously in opposite directions, as indicated by arrows $a$ in FIG. 3, into the position illustrated in FIG. 4 whereupon they may be locked by releasing the knobs 15. The channel member 4 is moved on the guide brackets 22 into the operative position in which the door 3, not itself visible in FIGS. 3 and 4 is free to be moved along the outer side face of the truck body 1 by a handle 32 in the direction of the arrow $b$ (FIG. 1) into the position shown in FIG. 2 in which the door 3 gives free access to the opening 2.

The door arrangement of the invention has all the well-known desirable features of a conventional sliding door, yet, it does not rely on permanently installed guide rails which project outward or inward beyond the wall of the vehicle when the latter is ready to travel, and which reduce the available load bearing area of the vehicle to less than is determined by the prescribed overall dimensions of the vehicle.

It should be understood, of course, that the foregoing disclosures relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. In a door arrangement including a ceiling member and a floor member vertically bounding a load area, two upright lateral members connecting said ceiling and floor members and constituting therewith a door frame about a door opening, a door, and guide means securing said door to said frame for movement of the door between a closed position in which the door is received in said opening and an open position offset from the closed position outwardly of said load area and in a lateral direction, the improvement in the guide means which comprises:
   (a) a first guide member elongated in said lateral direction;
   (b) a plurality of receptables mounted on said floor member in laterally spaced relationship, said receptacles being downwardly spaced from said opening, in vertical alignment with the same;
   (c) a plurality of second guide members fixedly fastened to said first guide member and respectively received in said receptacles for linear movement in a direction transverse of said lateral direction,
      (1) said first guide member moving into and out of said opening between a retracted position and an operative position when said second guide members move in said receptacles;
   (d) means securing said door to said first guide member for movement thereon in a lateral direction; and
   (e) moving means mounted on said door frame for moving said first guide member between said positions thereof.

2. In an arrangement as set forth in claim 1, top guide means including a guide elongated in said lateral direction, a plurality of receptacles mounted on said ceiling member in laterally spaced relationship and upwardly spaced from said opening, a plurality of brackets fixedly fastened to said guide and respectively received in the receptacles of said top guide means for linear movement in said transverse direction, means securing said door to said guide for relative movement in said lateral directional, and means connecting said guide to said moving means for simultaneous movement of said first guide member and of said guide by said moving means into and out of said door opening.

3. In an arrangement as set forth in claim 2, said moving means including a first latch member having a free end portion, pivot means securing said latch member to the underside of said bottom member for arcuate movement of said free end portion, and abutment means on said first guide member engaging said free end portion for movmet of the first guide member between said positions thereof in response to said arcuate movement of the free end portion; and said connecting means including a second latch member having a free end portion and secured to said ceiling member for arcuate movement of the free end portion thereof, motion transmitting means operatively interposed between said latch members for joint movement of the latch members, abutment means on said guide engaging the free end portion of said second latch member for movement of the guide into and out of the door opening during the arcuate movement of the free end portion of said second latch member, and locking means for lacking said latch members to said door frame in two angularly offset positions.

4. An arrangement as set forth in claim 1, wherein said guide means include a third guide member elongated in said lateral direction and longitudinally movable on said first guide member, said door being mounted on said third guide member for movement relative to the same in said lateral direction.

5. An arrangement as set forth in claim 4, further comprising cooperating stop means on said door, said first guide member, and said third guide member for limiting relative movement thereof in said lateral direction.

References Cited

UNITED STATES PATENTS

| | | | |
|---|---|---|---|
| 2,445,131 | 7/1948 | Wartian | 49—212 X |
| 2,612,659 | 10/1952 | O'Connor | 49—212 |
| 2,893,071 | 7/1959 | Oden | 49—130 |
| 3,051,999 | 9/1962 | Schimek | 49—212 |

KENNETH DOWNEY, *Primary Examiner.*